(12) United States Patent
Iverson

(10) Patent No.: US 8,544,198 B2
(45) Date of Patent: Oct. 1, 2013

(54) ILLUMINATED LICENSE PLATE HOLDER

(76) Inventor: David Iverson, Boca Raton, FL (US)

( * ) Notice: Subject to any disclaimer, the term of this patent is extended or adjusted under 35 U.S.C. 154(b) by 94 days.

(21) Appl. No.: 12/780,505

(22) Filed: May 14, 2010

(65) Prior Publication Data

US 2010/0307038 A1 Dec. 9, 2010

Related U.S. Application Data

(60) Provisional application No. 61/178,773, filed on May 15, 2009.

(51) Int. Cl.
*G09F 7/00* (2006.01)
(52) U.S. Cl.
USPC .................................. 40/204; 40/209; 40/591
(58) Field of Classification Search
USPC .................................... 40/200, 204, 209, 591
See application file for complete search history.

(56) References Cited

U.S. PATENT DOCUMENTS

| | | | |
|---|---|---|---|
| 4,857,890 A | 8/1989 | Solow | |
| 5,029,053 A | 7/1991 | Solow | |
| 5,435,087 A | 7/1995 | Karkar et al. | |
| 5,692,327 A | 12/1997 | Wynne et al. | |
| 5,732,927 A * | 3/1998 | Purpura | 248/539 |
| 5,815,976 A * | 10/1998 | Jernigan et al. | 43/21.2 |
| 6,007,033 A * | 12/1999 | Casson et al. | 248/224.7 |
| 6,253,476 B1 * | 7/2001 | Powell | 40/591 |
| 6,345,587 B1 * | 2/2002 | Toscano | 116/30 |
| 6,381,886 B1 * | 5/2002 | Chou | 40/209 |
| 6,526,680 B1 | 3/2003 | Yu | |
| 2003/0140536 A1 * | 7/2003 | Bilyeu | 40/574 |

* cited by examiner

*Primary Examiner* — Casandra Davis
(74) *Attorney, Agent, or Firm* — McHale & Slavin, P.A.

(57) ABSTRACT

The present device relates to a license plate holder, and more specifically to a license plate holder with illumination for attachment to remote locations on a vehicle. The license plate holder includes a backing plate sized for attachment of a license plate. A support member extends outwardly from the backing plate and is sized and shaped for insertion into a boat rod holder. A self-contained electrical system is included in the license plate holder for illumination of the license plate. The self-contained electrical system includes at least one LED, a switch, an electrical storage device and at least one solar panel. The illuminated license plate holder may be mounted on a watercraft while being hauled on a trailer so that the license plate is not subject to scraping, mutilation, or destruction; as typically occurs when a license plate is affix to a trailer.

15 Claims, 5 Drawing Sheets

ILLUMINATED LICENSE PLATE HOLDER

RELATED APPLICATIONS

This application claims the priority benefit of U.S. Provisional Application No. 61/178,773, entitled Illuminated License Plate Holder and filed May 15, 2009, the contents of which are incorporated herein by reference.

FIELD OF THE INVENTION

This invention relates generally to a license plate holder and, more particularly, to a solar powered illuminated license plate holder to be mounted to a remote surface apart from a trailer.

BACKGROUND OF THE INVENTION

A vehicle registration plate is typically a metal or plastic plate attached to a vehicle such as a motor vehicle or trailer for official identification purposes. The registration identifier is a numeric or alphanumeric code that uniquely identifies the vehicle within the issuing regions database. Whether the identifier is associated with a vehicle or person varies by the issuing agency. Also depending on the agency the vehicle registration plate may be called a registration plate, a license plate, a number plate or a tag. Most state governments require a license plate to be attached to both the front and rear of the vehicle, while others only require a license plate to be attached to the rear of the vehicle. In addition, some jurisdictions require other types of identification for vehicles that are not required to have license plates. One example of these vehicles would be slow moving vehicles such as tractors or horse drawn carriages. With these vehicles, it is typically required to display a triangle on the back of the vehicle to indicate that the vehicle is slow moving. The license plate, on a road vehicle such as a car or truck, is typically placed on the vehicle's bumper or trunk lid, which includes an illumination means for making the license plate plainly visible at night. Over the years many designs for illuminated license plate holders or license plate toppers have been proposed. Such license plate holders are desirable because they make the license plate more conspicuous and serve the public's need for conspicuous identification of vehicles at night when identification may be difficult. For instance, U.S. Pat. No. 4,857,890 discloses a topper style rear license plate that has a string of lights disposed around the perimeter. The license plate topper lights are typically connected to the running light circuit of the vehicle and operate in conjunction therewith by receiving electrical power from the vehicle.

Trailers are generally non-powered vehicles pulled by a powered vehicle for the transportation of goods or materials. In most states, a trailer being over a predetermined length is required to be registered and titled. The trailer must then have a license plate attached to the rear of the trailer to be plainly visible to other motorists. The license plate and/or license plate holder is generally attached to the backside of the trailer on the lowermost corner or the centermost portion of the trailer's frame so as not to swing during motion of the trailer. The low mounting position is utilized to allow easy access to the storage area of the trailer. The owner of the trailer is required to make sure that the letters, numerals, printing, writing, and other identification marks upon the license plate are clear and distinct and free from defacement, mutilation, grease, and other obscuring matter at all times. The owner is also responsible to make sure that the license plate is illuminated after dusk. Power for illuminating the license plate is generally transferred through a wiring harness extending from the towing vehicle to the trailer.

A downside to attaching the license plates and/or license plate holders to the lower rear portion of the trailer is that they are subject to harsh environmental elements. In use, trailers are commonly used for the transportation of vessels, vehicles, goods, tractors, campers, or the like, all of which weigh substantially on the trailer and lower the trailer's frame, thereby bringing the license plate holder closer to the ground and increasing the possibility of scraping, mutilation, and destruction. Other circumstances which increase the possibility of the license plate being damaged or torn off include road conditions such as bumps, ramps, driveways, railroad crossings and the like. In some circumstances, the trailer may be hauling a vessel into a saltwater environment; thereby the trailer must enter and leave the saltwater environment subjecting the illuminated license plate holder and wiring harness to saltwater and thus corrosion. Therefore, it is not uncommon for a trailer owner to be unaware that the license plate or wiring harness has been either damaged, disabled or torn from the trailer during travel. The damage or disablement may subject the owner to fines for non-compliance with laws and ordinances.

Thus what is needed in the art is an illuminated license plate holder which is not mounted on a trailer frame and does not receive power from the towing vehicle. The illuminated license plate holder should be constructed and arranged for attachment to a remote location that may be separate from the trailer so as not to subject the license plate and/or holder to the scraping, mutilation and destruction typically associated with trailers. The illuminated license plate holder should include a mounting system that is easily adapted for use with various trailers and vehicles, and particularly to watercraft. The illuminated license plate holder should include a self contained electrical system having a plurality of light sources powered by a battery system charged by a solar panel for illumination of the license plate at night.

SUMMARY OF THE INVENTION

The instant invention provides an illuminated license plate holder having a frame preferably formed of oppositely disposed top and bottom horizontal backing plate members and oppositely disposed parallel vertical side members interconnected to define a rectangle sized to fit a standardized license plate. The frame includes a front surface and a back surface. The top horizontal backing plate member has two mounting apertures extending through the front and back surface and spaced by a standardized distance for alignment with the license plate. On the back surface of the frame a support member is attached which extends downwardly therefrom. The support member is preferably tubular in construction and sized for insertion into a standardized boat rod holder or an independent mounting assembly. The support member may alternatively include a fastening means such as bolt apertures or threaded inserts for attachment to a remote surface. The support member may also include a knuckle-joint for adjusting the angle of the frame with respect to the support member. At least one solar panel is disposed in substantially perpendicular relationship to the top horizontal backing plate member; a battery, capacitor, bat-cap or other suitable storage device is preferably disposed within the support member and electrically connected with the solar panel so as to facilitate charging of the storage device by the solar panel. A plurality of light sources are disposed within or adjacent to the frame and in electrical communication with the solar panel and storage device so as to receive electrical power therefrom so that the light sources illuminate the license plate within the frame. An automatic or manual switch may be provided to connect the storage device to the light sources. In this manner, the stored power may be conserved until after dusk when the license plate is required to be illuminated.

Accordingly, it is an objective of the present invention to provide an illuminated license plate holder contemplated for use on a watercraft being hauled on a trailer, whereby the tubular member is attached to the watercraft by inserting the tubular member into a rod holder or flag post holder on the rear portion of the watercraft. The tubular member may include clamps for attachment to various surfaces should a boat rod holder or flag post holder not be available on the watercraft. Thus, the illuminated license plate holder is not attached to the trailer but is securely mounted on the watercraft being hauled by the trailer, making the license plate conspicuous and plainly visible at all times, day and night.

It is another objective of the present invention to provide an illuminated license plate holder capable of being used at night or day, and always being conspicuous to the public. The solar panel provides a means to recharge the battery during sunlight hours and the battery powers the light sources at night.

It is yet another objective of the present invention to provide an illuminated license plate holder which does not subject the license plate to the scraping, mutilation, and destruction it is typically exposed to because it is not conventionally attached to the backside lowermost portion of the trailer frame.

It is still yet another objective of the present invention to provide an illuminated license plate holder that is not subject to being immersed in freshwater or saltwater during launching or hauling of the watercraft.

It is a further objective of the present invention to provide an illuminated license plate holder having a frame which is triangular for placement of a warning sign to be mounted on a tractor, heavy duty equipment, or the like for warning following vehicles of the present hazard. The warning sign would be conspicuous to the following vehicle and plainly visible at night with the illuminating light sources.

It is yet a further objective of the present invention to provide an illuminated license plate holder utilizing a simple design which may be easily and economically fabricated.

It is also a further objective of the present invention to provide an illuminated license plate holder which is durable and maintenance free even when exposed to relatively harsh conditions commonly encountered over the life of a watercraft, trailer, or vehicle.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
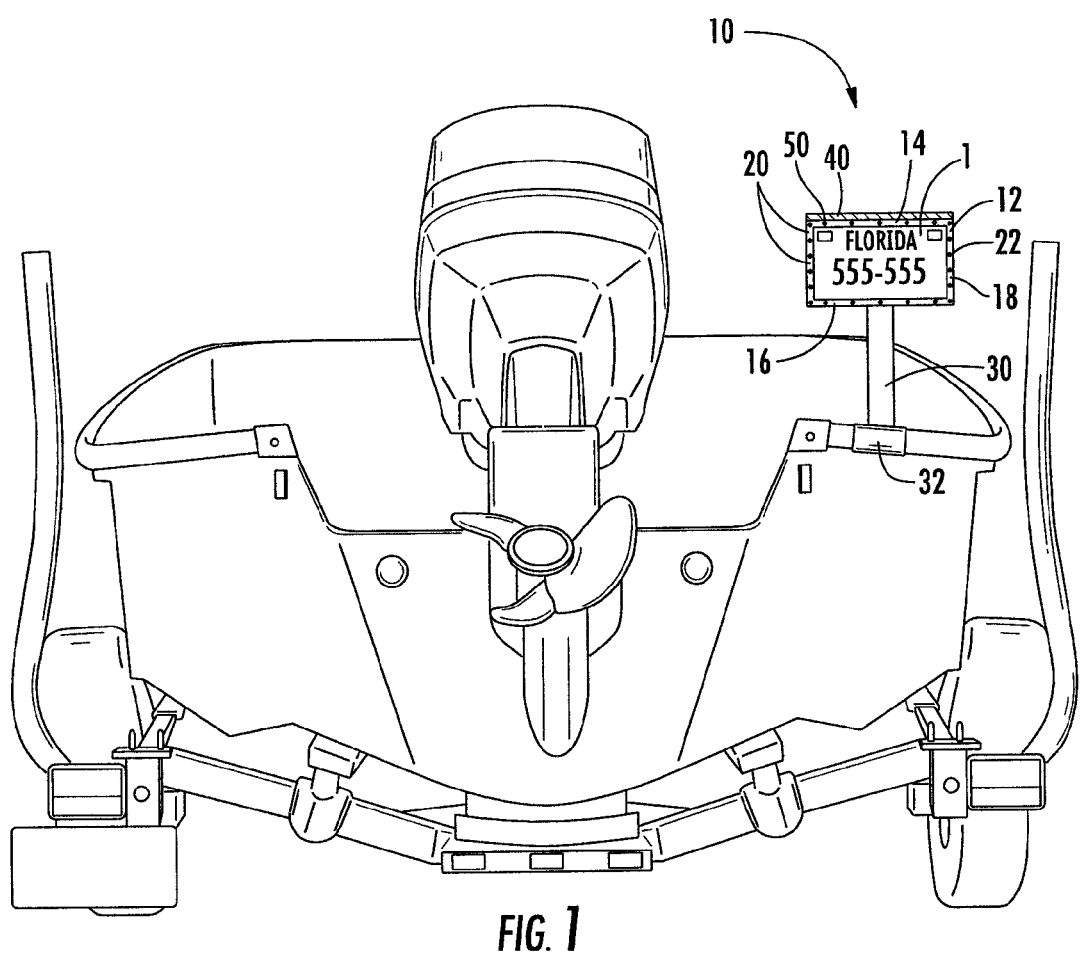
FIG. 1 is a front view of the preferred embodiment of the illuminated license plate holder as constructed by the teachings of the present invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
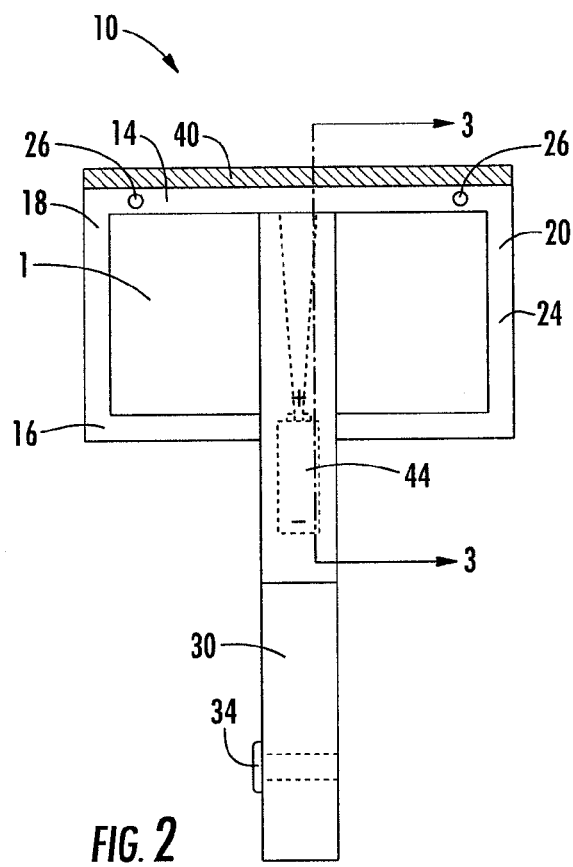
FIG. 2 is a rear view of a preferred embodiment of the illuminated license plate holder of the present invention.
Figure 3:
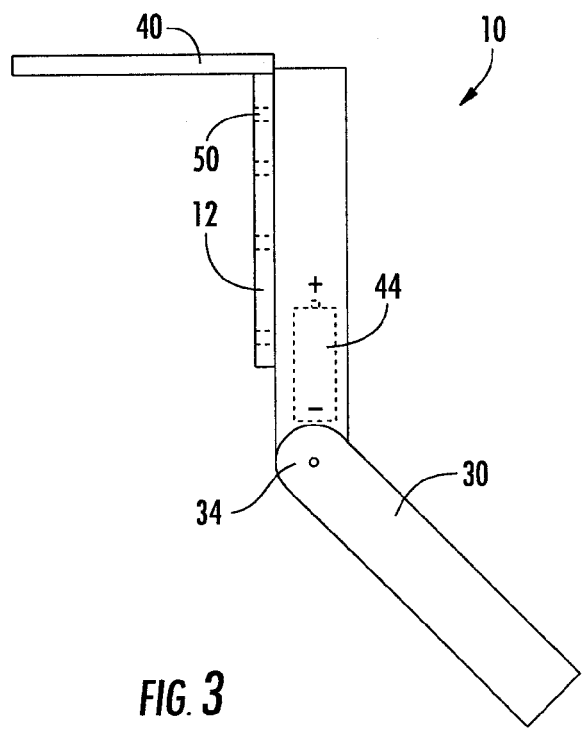
FIG. 3 is a cross-sectional view of a preferred embodiment of the illuminated license plate holder along the line 3-3 in FIG. 2.

Referring now to FIGS. 1-3, a preferred embodiment of an illuminated license plate holder 10 is illustrated. The illuminated license plate holder 10 includes a frame 12, support member 30, solar panel 40, battery 44, and light sources 50. The frame 12 preferably comprises oppositely disposed top horizontal backing plate member 14 and bottom horizontal backing plate member 16 and oppositely disposed parallel vertical side members, 18 and 20. The top and bottom horizontal backing plate members, 14 and 16, respectively, are longer than the parallel vertical side members, 18 and 20. The members are interconnected to define a rectangle sized to fit around a standardized license plate 1. The frame 12 includes a front surface 22 and a back surface 24. The top horizontal backing plate member 14 includes two mounting apertures 26 extending through the front surface 22 and back surface 24 and spaced a distance apart for alignment with the license plate 1. The bottom horizontal backing plate member 16 may also include two mounting apertures 26 extending through the front surface 22 and back surface 24 and spaced apart by a distance for alignment with the license plate 1 (shown in FIG. 2). The frame 12 may be constructed of plastic, aluminum, stainless steel, plexiglass, or any other durable and reliable material. The frame 12 does not obstruct any of the letters, numerals, printing, writing, and other identification marks on the license plate.

Figure 4:
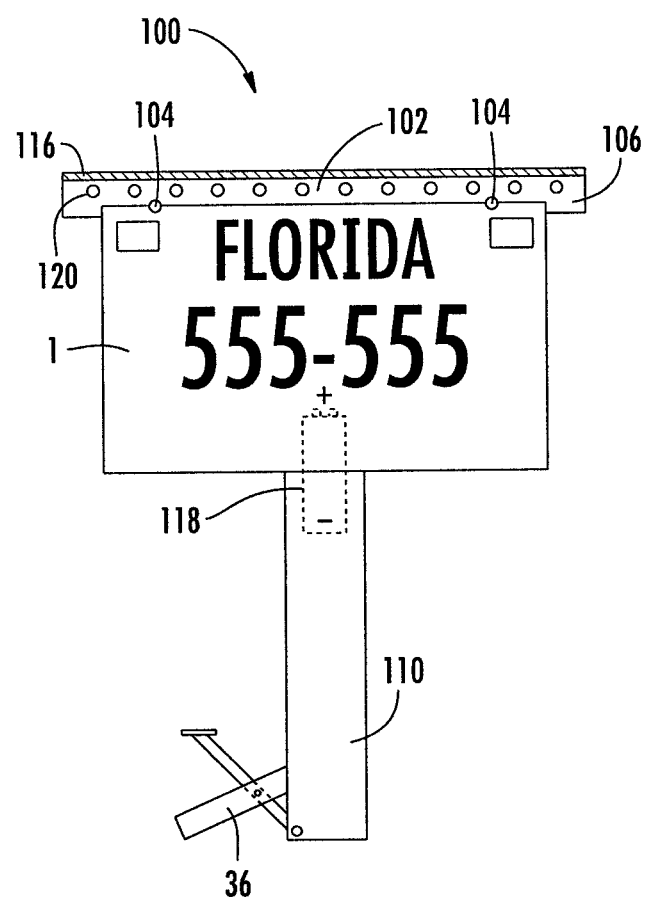
FIG. 4 is a front perspective view of another embodiment of the illuminated license plate holder of the present invention.
Figure 5:
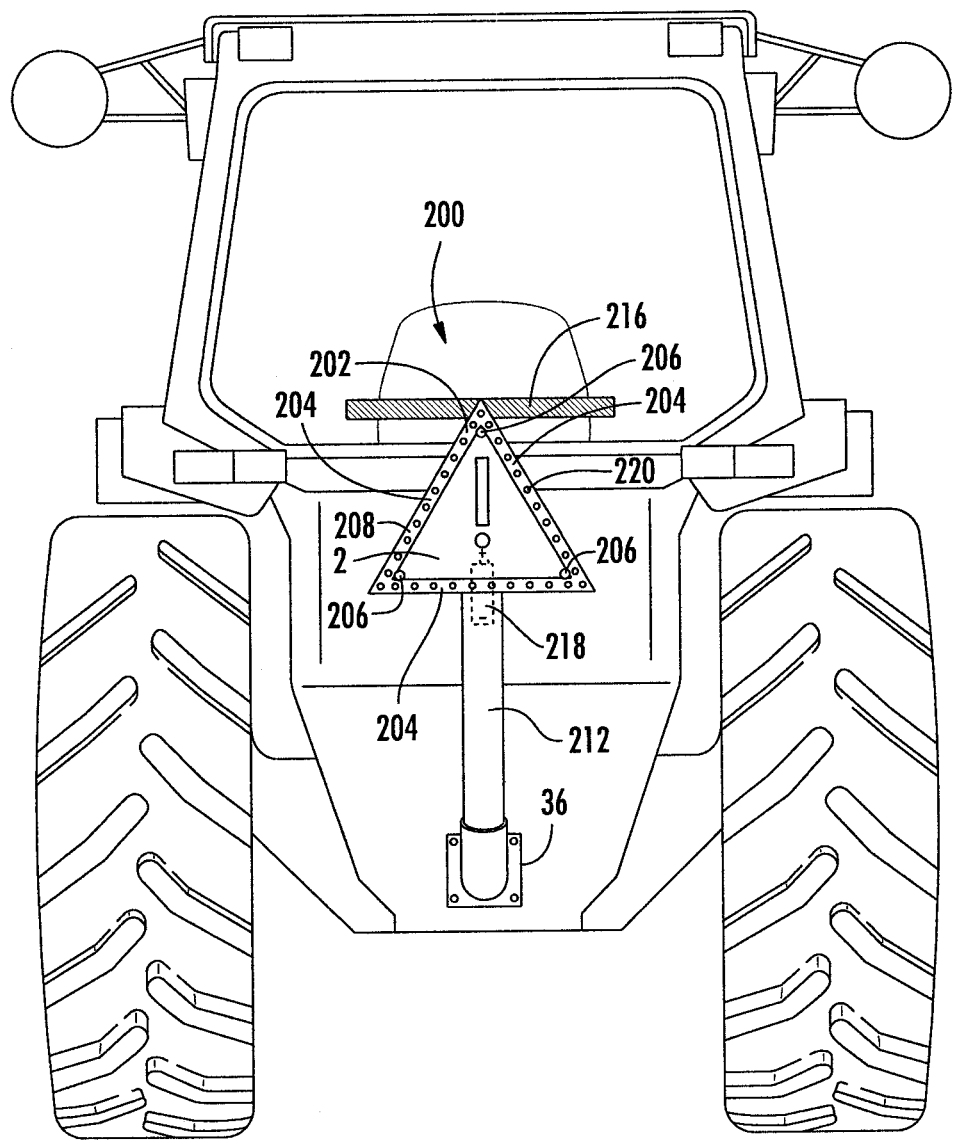
FIG. 5 is a front plane view of a further embodiment of the illuminated license plate holder of the present invention.

On the back surface 24 of the frame 12 is attached a support member 30 which extends outwardly therefrom. As shown in FIG. 2, the support member 30 is affixed to the top horizontal backing plate member 14; however, the support member 30 may be affixed anywhere about the frame 12 without departing from the scope of the invention. The support member 30 is preferably tubular in construction and may be sized for insertion into a rod holder 32 on a watercraft. It should be noted that while the support member is illustrated as a round tubular member it could alternatively be constructed of any combination of shaped tubular or non-tubular extruded members to prevent rotation of the assembly or provide support for the license plate holder. As shown in FIG. 1, the illuminated license plate holder 10 is mounted within a rod holder or flag post 32 when the vessel is loaded on a trailer for hauling. The illuminated license plate holder 10 is not attached to the trailer frame and is therefore not subject to scraping, mutilation, and destruction, which is typically experienced with license plates attached to trailer frames. Because many boat rod holders 32 are angled, the support member 30 may include bends or curves so that the frame 12 is substantially perpendicular to the ground surface when installed, as shown in FIG. 3. Additionally, the support member 30 may include a knuckle-joint 34 for adjusting the angle of the frame 12 relative to the ground surface when the support member 30 is mounted. The support member 30 may further include a fastener 36, as shown in FIGS. 4 and 5, for attachment to remote surfaces, such as, but not limited to, vehicles, trailers, vessels, farm equipment, and the like. The fastener 36 is preferably a device or mechanism suitable for holding or securing the license plate holder to a surface or vehicle to prevent movement or separation therefrom. The fastener 36 may include, but is not limited to, bolts, screws, rivets, clamps, straps, buckles, or the like.

Still referring to FIGS. 1-3, at least one solar panel 40 is disposed in a substantially perpendicular relationship in relation to the top horizontal backing plate member 14. A battery 44 is disposed within the tubular member 30 and electrically connected with the solar panel 40 so as to facilitate charging of the battery 44 by the solar panel 40. The battery 44 is preferably enclosed within the tubular member 30 so that the battery 44 is not exposed to the outside environmental conditions. The battery 44 is preferably rechargeable but may alternatively be replaceable. Light sources 50 are disposed about the frame 12 and are in electrical communication with the solar panel 40 and battery 44 so as to receive electrical power therefrom. The light sources 50 illuminate the license plate 1 within the frame 12. Those skilled in the art will recognize that various circuits for facilitating charging of the battery 44 via the solar panel 40, and operation of the light sources 50 from either the battery 44 or the solar panel 40 are suitable. The light sources 50 are preferably comprised of light emitting diodes (LEDs); however, alternative light sources are contemplated including but not limited to, incandescent light or fluorescent light.

As shown in FIG. 4, an alternative embodiment of the illuminated license plate holder 100 comprises of a horizontal backing plate 102 having two mounting apertures 104 extending through the front surface 106 and back surface 108, not shown, and spaced by a standardized distance for alignment with the license plate 1. A tubular member 110 is affixed to the back surface 108, not shown, of the horizontal backing plate member 102. The tubular member 110 is sized for insertion into a boat rod holder or flag post, not shown. The tubular member 110 includes a fastener mechanism 36 attachable to the backside of a vessel or vehicle. Solar panels 116 are aligned in substantially perpendicular relationship with the horizontal backing plate 102. A battery 118 is disposed within the tubular member 110 and electrically connected with the solar panel 116 so as to facilitate charging of the battery 118 by the solar panel 116. Light sources 120 are disposed about the horizontal backing plate 102 and are in electrical communication with the solar panel 116 and battery 118 so as to receive electrical power therefrom so that the light sources 120 illuminate the license plate 1.

Figure 7:
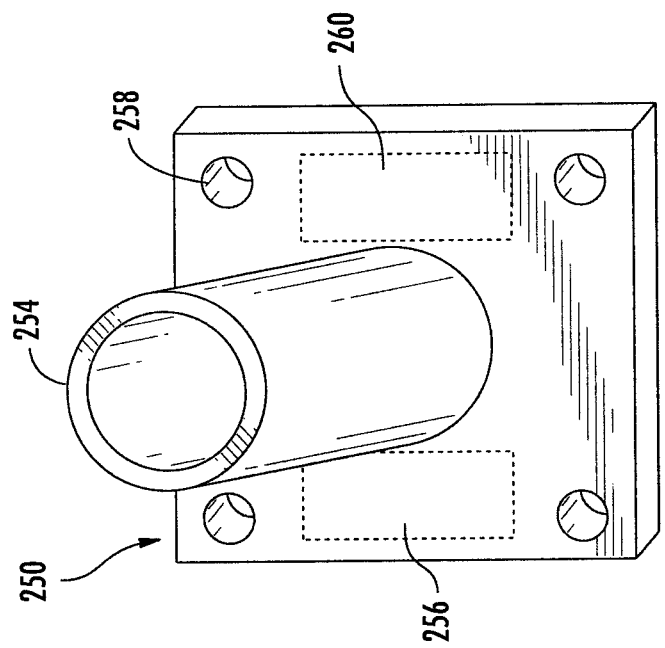
FIG. 7 is a top perspective view of a mounting assembly suitable for use with the instant invention.
Figure 6:
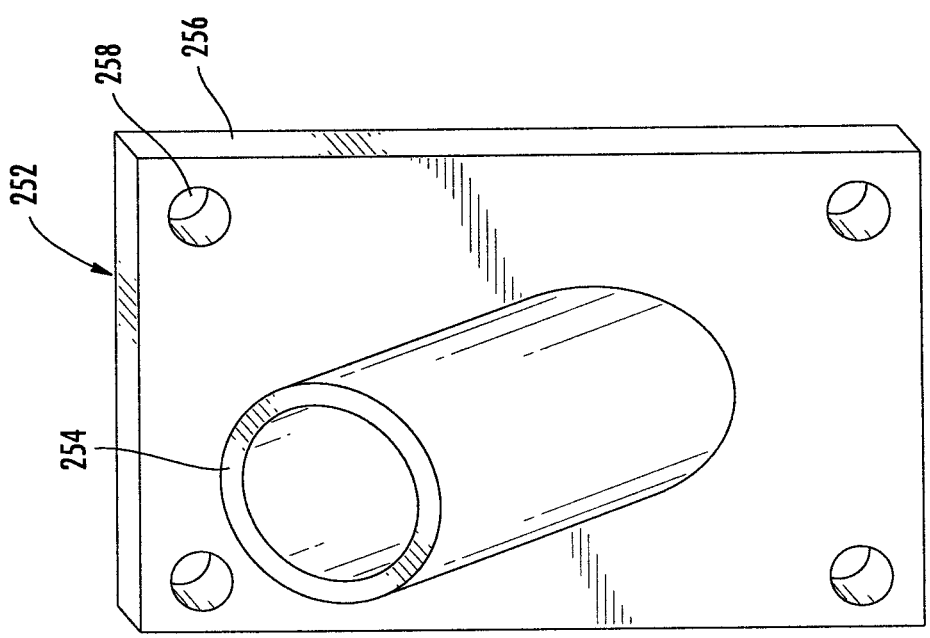
FIG. 6 is top perspective view of a mounting assembly suitable for use with the instant invention.

Referring to FIGS. 5-7, an additional embodiment of the illuminated license plate holder 200 for use with warning signs is illustrated. This embodiment includes a frame 202 including three equilateral members 204 interconnected to define a triangle sized to fit a standardized warning sign 2. However, it is contemplated the frame for the illuminated license plate holder may define any geometrical shape sized to fit any warning sign or the like. The frame 202 includes apertures 206 thereon extending through the front surface 208 and back surface 210, not shown, and spaced by a standardized distance for alignment with the warning sign 2. A tubular support member 212 is affixed to the back surface 210, not shown, of the frame 202. The support member 212 may be sized for insertion into a mount assembly 250, angled mount assembly 252, boat rod holder or other tubular structure suitable for supporting the license plate holder. The mount assembly preferably includes a stub portion 254 sized to fit over or into the end of the support member a sufficient distance to support the license plate holder. The stub portion may include shapes that are substantially conjugate to the support member to prevent rotation or provide support thereto. The mount assembly may also include a plate 256 secured to the stub portion to maintain a fixed angle between the plate and the stub member. The plate 256 may include apertures 258, magnets 260, hook and loop or other means of securing the plate to the surface of a vehicle. Alternatively, the tubular member 212 may include an attached or integrally formed fastening mechanism 36 attachable to a surface of a vehicle. Solar panels 216 are aligned in substantially perpendicular relationship with the frame 202. A battery 218 is preferably disposed within the tubular member 212 and electrically connected with the solar panel 216 so as to facilitate charging of the battery 218 by the solar panel 216. Light sources 220 are disposed about the frame 202 and are in electrical communication with the solar panel 216 and battery 218 so as to receive electrical power therefrom. The light sources 220 are preferably LEDs and are generally constructed and arranged to illuminate the warning sign 2.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A remote license plate holder with illumination comprising:
  a backing plate member having a front surface and a back surface, said backing plate member adapted for attachment of a license plate;
  a support member, said support member including a first end, a center portion, and a second end, said first end secured to said backing plate member, said center portion extending outwardly with respect to said backing plate, said second end constructed and arranged for attachment to the rear portion of a vehicle, said center portion of said support member includes a knuckle joint, said knuckle joint constructed and arranged for varying the respective angle between said first end of said support member and said second end of said support member, said second end of said support member sized for insertion into a rod holder of a watercraft;

a self contained electrical system including at least one light source, a switch, at least one solar panel and an electrical storage device, said at least one light source secured to said backing plate member so that said at least one light source illuminates said license plate, said light sources in electrical communication with said switch, said switch in electrical communication with said electrical storage device, said switch being constructed and arranged to connect said electrical storage device and said at least one light source to cause illumination thereof, said at least one solar panel in electrical communication with said electrical storage device.

2. The remote license plate holder with illumination of claim 1, wherein said backing plate is defined by a horizontal backing plate member, an oppositely disposed and substantially parallel bottom horizontal backing plate member, and oppositely disposed and substantially parallel vertical side members.

3. The remote license plate holder with illumination of claim 1, wherein said backing plate includes said plurality of light sources disposed thereon to illuminate a license plate.

4. The remote license plate holder with illumination of claim 1, including a mount assembly constructed and arranged for attachment to a remote surface.

5. The remote license plate holder with illumination of claim 4 wherein said mount assembly includes a stub portion and a plate portion, said stub secured to said plate portion in a fixed relationship.

6. The remote license plate holder with illumination of claim 5 wherein said stub portion is sized and shaped to fit around said second end of said support member.

7. The remote license plate holder with illumination of claim 5 wherein said stub portion is sized and shaped to fit within said second portion of said support member.

8. The remote license plate holder with illumination of claim 5 wherein said plate portion includes apertures sized to accept fasteners for securing said plate to a vehicle.

9. The remote license plate holder with illumination of claim 5 wherein said plate portion includes at least one magnet secured thereto for securing said plate to a vehicle.

10. The remote license plate holder with illumination of claim 1 wherein said at least one solar panel is connected to said backing plate at about a ninety degree angle with respect thereto.

11. The remote license plate holder with illumination of claim 1 wherein said support member is tubular in construction.

12. The remote license plate holder with illumination of claim 11 wherein said electrical storage device is positioned within said support member.

13. The remote license plate holder with illumination of claim 1 wherein said electrical storage device is a battery.

14. A remote license plate holder with illumination comprising:
a backing plate member having a front surface and a back surface, said backing plate member adapted for attachment of a license plate;
a support member, said support member including a first end, a center portion, and a second end, said first end secured to said backing plate member, said center portion extending outwardly with respect to said backing plate, said center portion including a knuckle joint, said knuckle joint constructed and arranged for varying the respective angle between said first end of said support member and said second end of said support member, said second end constructed and arranged for attachment to the rear portion of a vehicle;
a self contained electrical system including at least one light source, a switch, at least one solar panel and an electrical storage device, said at least one light source secured to said backing plate member so that said at least one light source illuminates said license plate, said light sources in electrical communication with said switch, said switch in electrical communication with said electrical storage device, said switch being constructed and arranged to connect said electrical storage device and said at least one light source to cause illumination thereof, said at least one solar panel in electrical communication with said electrical storage device.

15. A remote license plate holder with illumination comprising:
a backing plate member having a front surface and a back surface, said backing plate member adapted for attachment of a license plate;
a support member, said support member including a first end, a center portion, and a second end, said first end secured to said backing plate member, said center portion extending outwardly with respect to said backing plate, said second end constructed and arranged for attachment to the rear portion of a vehicle;
a self contained electrical system including at least one light source, a switch, at least one solar panel and an electrical storage device, said at least one light source secured to said backing plate member so that said at least one light source illuminates said license plate, said light sources in electrical communication with said switch, said switch in electrical communication with said electrical storage device, said switch being constructed and arranged to connect said electrical storage device and said at least one light source to cause illumination thereof, said at least one solar panel in electrical communication with said electrical storage device;
a mount assembly constructed and arranged for attachment to a remote surface, said mount assembly including a stub portion and a plate portion, said stub secured to said plate portion in a fixed relationship, said plate portion including at least one magnet secured thereto for securing said plate to a vehicle.

\* \* \* \* \*